Nov. 23, 1965 R. B. CRAVEN 3,219,875

WAVEFORM GENERATING CIRCUITS

Filed May 17, 1963

INVENTOR
ROBERT B. CRAVEN
BY Herbert W. Arnold
ATTORNEY 3,219,875

WAVEFORM GENERATING CIRCUITS

Robert B. Craven, Wayland, Mass., assignor to Raytheon Company, Lexington, Mass., a corporation of Delaware Filed May 17, 1963, Ser. No. 281,100
9 Claims. (Cl. 315—27)

Figure 1:
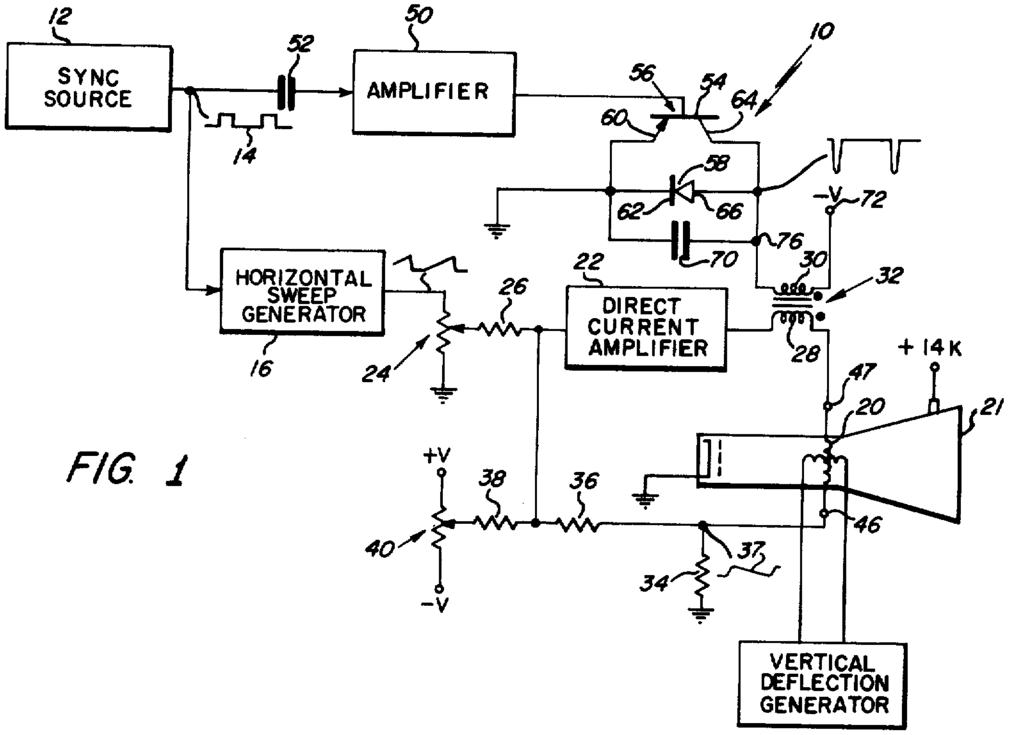

This invention relates to waveform generating circuits and, more particularly, to the generation of a substantially linear sawtooth current waveform particularly suitable for the magnetic deflection yoke of a cathode ray tube electromagnetic deflection system, as well as other uses relating to electromagnetic scanning.

In the past, waveform generating circuits, particularly of the type used to produce a linear high-current repetitive sawtooth current for electromagnetic beam deflection in high resolution television-type displays, have utilized a direct current feedback amplifier to produce a high-current linear sweep. A feedback signal proportional to the deflection coil current is compared to the input sweep signal and the amplified difference drives the deflection coil of the display apparatus so as to reduce this difference to zero. The amplifier is capable of supplying the required sawtooth current only if it has the voltage swing capability required to do so, that is, the amplifier output stage must withstand peak voltage and current conditions nearly simultaneously. The beam deflection angle $\theta$ is proportional to the number of turns N of the deflection coil and the deflection current I. Also, the constant voltage E required to linearly change the deflection coil current is proportional to the inductance of the deflection coil L times the required change of current. That is, for a given NI product required for beam deflection, the deflection coil voltage varies directly with the turns of the deflection coil. Relatively large inductances are used in conjunction with vacuum tube horizontal deflection amplifiers to reduce the required deflection current and generally require a deflection voltage in the kilovolt range. Where it is desirable to use lightweight semiconductor or transistor circuitry for space and power consumption considerations, the provision of a transistor horizontal deflection circuit capable of the highly linear beam deflection required in high-accuracy, large-screen cathode ray tube displays presents a more severe problem than with vacuum tube applications.

For example, high powered transistors, in addition to their inherently low breakdown voltages, have relatively slow response times as compared to vacuum tubes. Horizontal deflection coils used with transistor deflection amplifiers are constructed with as few turns as possible to minimize their inductance, and, consequently, the flyback voltage developed during the beam retrace interval. The limit in reduction of the deflection coil inductance by this method is reached when the large diameter wire required to handle the increased current produces a discrete, rather than continuous, magnetic deflection field within the deflection coil. Reduction of the horizontal deflection coil inductance to this limit still heavily taxes the amplifier output transistors in terms of the high voltage and current demands required to reset the horizontal deflection current during the short flyback interval of, for example, five to ten microseconds. Transistors capable of meeting the conditions of high current and voltage, which occur almost simultaneously in the usual horizontal deflection amplifier circuitry, are presently quite expensive and generally unreliable under the stringent requirements imposed on such amplifier transistors. Additionally, as such operating requirements become more severe, particularly with expanded and precision sweeps applied to deflection coils, existing transistor circuitry may prove inadequate to provide these voltage and current demands.

Accordingly, it is an object of the present invention to provide an improved waveform generating circuit, such as is applicable to use in electromagnetic beam deflection devices. It is a further object of the invention to provide an improved transistor scanning generator capable of producing a substantially linear sawtooth current waveform in a magnetic deflection yoke.

In accordance with the invention, a separate voltage source approximating the general waveform characteristics, such as the volt-ampere terminal characteristics required to provide the desired output waveform, is connected in a signal amplifier circuit to augment the signal amplifier output normally used to transmit the desired output waveform to a load.

In particular, in the present embodiment, a separate voltage source having the volt-ampere terminal characteristics required to obtain, for example, a nearly linear sweep waveform in a deflection yoke of a cathode ray tube scanning circuit is coupled in series with a direct current feedback amplifier and the deflection coil. A current sensing device, such as a resistor, is connected in the feedback loop of the deflection yoke or coil and amplifier to develop a feedback signal proportional to deflection current which is fed to the input of the sweep amplifier to provide an error signal at the input of the feedback amplifier. The separate voltage source of the generator provides, in accordance with the invention, the major portion of the voltage to the load, or horizontal deflection coil, thus permitting the amplifier to supply only the relatively small difference voltage required to make the sweep deflection linear, inasmuch as it provides substantially only the power required to overcome the various resistive drops in the deflection coil circuit. The separate voltage source is provided, in this embodiment, in conjunction with a resonant flyback sweep generation circuit in which a transistor-diode switch is used during the sweep period, to short circuit a resonating capacitor which with the deflection coil forms an LC resonant circuit. During the sweep period, a substantially constant voltage is fed to the deflection coil. However, during the flyback period, the shunt transistor-diode switch is opened, placing the capacitor in series with the deflection coil so that the circuit resonates over a period, preferably at approximately twice the flyback time and the deflection coil current undergoes approximately a half-cycle of oscillation during the flyback time, the capacitor being used to reset the current to the value required at the sweep start. The transistor-diode switch, which is used to perform the switching function in this embodiment, is driven by horizontal synchronizing pulses which are used to generate the sweep input to the deflection or sweep amplifier and which also may be used to blank the cathode ray tube during flyback. In particular, the diode which shunts the capacitor is poled to carry the deflection current during the first half of the sweep, and during the second half of the sweep period the current is carried by the transistor. The sweep is then restarted by the diode becoming forward biased and conducting at the completion of a resonant half cycle, the resonance providing the power to augment the output of the sweep amplifier. In this manner, a precise waveform generating circuit is provided, which can be used to generate sweep deflection without taxing the voltage and current requirements of the transistor sweep amplifier.

Figure 2:
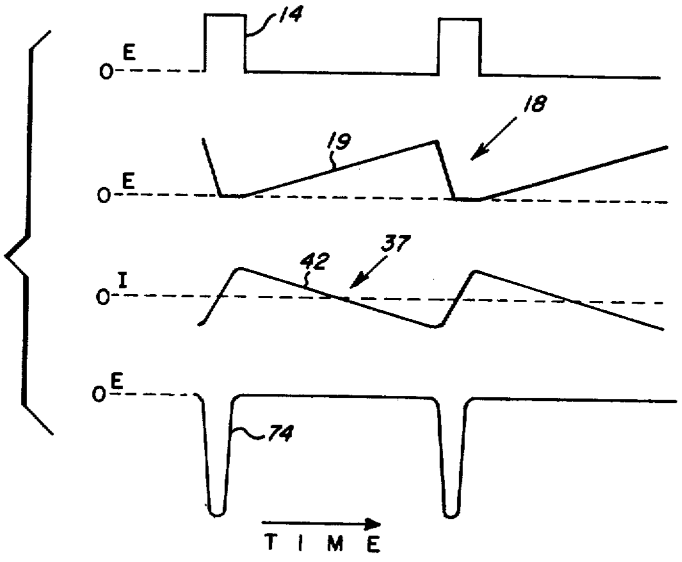

Other objects and features of this invention will be understood more clearly and fully from the following detailed description of the invention with reference to the accompanying drawings wherein:

FIG. 1 is a schematic diagram of a waveform generating circuit according to the invention; and FIG. 2 is a graphical representation of certain current waveforms helpful in describing the operation of the waveform generator of FIG. 1.

Referring to FIGS. 1 and 2, there is shown a schematic diagram of the waveform generator used in a horizontal deflection circuit 10. A synchronization pulse generator 12, which may be an external source, as from a receiver or the like, provides, for example, a six microsecond square wave 14 every thirty microseconds for the actuation of a horizontal sweep generator 16 which provides a horizontal sweep waveform 18. The sweep portion of the waveform is shown at 19 and is the input signal, the slope of which it is desired to reproduce accurately in the load, which in this embodiment is an inductive load shown as a horizontal deflection yoke coil 20 of a conventional cathode ray tube 21. The output of sweep generator 16, that is, waveform 18, is connected to a conventional direct current, coupled operational amplifier 22 by way of a conventional horizontal sweep size or width control 24 and a series input resistor 26. The output of operational or loop amplifiers 22 is applied to deflection yoke coil 20 by way of a secondary winding 28 having approximately twice the turns of primary winding 30 of a flyback transformer 32. Horizontal deflection coil 20 is connected to a current sensing resistor 34 which develops a feedback voltage proportional to the current in the deflection coil 20. This feedback voltage is shown in waveform 37 and is fed back to the input of amplifier 22 through current feedback resistor 36 to the input of the amplifier 22. A sweep centering control network comprising resistor 38 and potentiometer 40 is connected in the circuit to provide direct current centering of sweep on the face of the cathode ray tube in the usual manner. The sweep portion 42 of waveform 37 occurs during horizontal sweep time 19 of waveform 18. An error voltage is generated at the input to amplifier 22 which is proportional to the difference between input sweep 19 and the slope sweep portion 42 of waveform 37 where it is combined with the signal from sweep generator 16. In general, resistors 26 and 36 determine the voltage-to-current gain of the amplifier loop in a known manner. Terminals 46 and 47 are the output waveform terminals and deflection coil 20 in this embodiment is considered to be the load.

The output of sync generator 12 is also fed to a sync amplifier 50 which is a conventional pulse amplifier by way of coupling capacitor 52. The output of the sync amplifier is fed to base 54 of a PNP-type transistor 56. Transistor 56 is connected back-to-back with a conventional power diode 58. That is, emitter 60 is connected to cathode 62 and collector 64 is connected to anode 66 of diode 58. Resonating capacitor 70 is connected in shunt across the diode and transistor so that during conduction of either the transistor or diode, the capacitor 70 becomes shunted. Capacitor 70 is connected in series with primary 30 of isolation transformer 32 so that by transformer action it is connected in series with deflection coil 20 to form the LC resonant circuit, which during resonance provides the voltage source connected to augment the output of amplifier 22 in accordance with the invention. Terminal 72 is connected to a direct current source of approximately −10 volts which determines the amplitude of sweep waveform 37 by determining the voltage applied to transformer 32.

In operation, therefore, in response to the trailing edge of a sync pulse from sync generator 12, a horizontal sweep output is commenced and fed to amplifier 22. At the same time, the sync pulse is fed through amplifier 50 and the trailing edge of the pulse permits transistor 56 to conduct later on in the cycle, that is, when the transistor becomes biased for conduction in a manner to be described. Also, at the time of the trailing edge of the sync pulse output from amplifier 50, diode 58 is forward-biased and conducting due to the end of one-half cycle of the LC resonance during the succeeding flyback period providing a voltage across the diode.

FIG. 2 shows waveform 74 which is voltage at point 76, which is the voltage across capacitor 70 due to its resonance with the inductance of the deflection coil 20 at the end of the succeeding sweep. Thus, diode 58 is conducting during the start of the present sweep and holds the voltage at terminal 72 across the primary 30 of flyback transformer 32. This voltage is coupled by transformer action in series with the output of amplifier 22 and deflection coil 20, thus augmenting the output of amplifier 22 during the sweep period. This amplifier 22 is required to supply very little power during the production of the sweep. At approximately halfway through the sweep, when the deflection coil current changes from plus to minus, as the beam crosses the center of the cathode ray tube 21, transistor 56 becomes forward-biased and conducts, due to the change in current direction in the secondary 28 being coupled by transformer action to the diode-transistor switch. Diode 58 at this time becomes reverse-biased and opens. The change in current of deflection coil 20 through transformer action and the voltage source at terminal 72 applies these reverse bias voltages to the diode and transistor, so that during the entire sweep the voltage at terminal 72 remains applied to the primary 30 of transformer 32. Therefore, by transformer action this voltage remains coupled in the output circuit of the amplifier 22 where it is combined with the signal from amplifier 22. The sweep thus continues until the start of the succeeding sync pulse which terminates the output from sweep generator 18 and also applies a positive signal to the base 54 to turn off transistor 56. At this point, the flyback period commences and the energy which was stored in deflection coil 20 at the end of the sweep resonates with capacitor 70 which has been introduced into the circuit when transistor 56 opens. Diode 56 remains cut off by reverse bias developed by the resonant flyback action and particularly by voltage curve 74. During the resonance of the capacitor 70 and deflection coil 20, the relatively high voltage E required to reset the deflection coil to the start of the next sweep is not applied to the output transistors of amplifier 22, since the voltage is developed across the primary of the transformer rather than across the transistors in amplifier 22. In addition, due to transformer action, transistor 56 is not subjected to the full reset voltage in the secondary 28 which is used to reset the horizontal deflection coil to the start of the sweep.

Referring to waveforms 37 and 74 of FIG. 2, as the current I in the deflection coil passes through zero and voltage E of waveform 74 reaches its maximum negative value, the deflection current reverses and continues in the positive direction until the completion of the flyback period. At this point, diode 58 becomes forward-biased and conducts, which terminates the resonance at the completion of one-half cycle, thus starting the next sweep. Amplifier 22, during the sweep, supplies the voltage in series with the primary 28 and in conjunction with the feedback loop, maintains the sweep 37 linear as determined by the input signal 19.

It should be noted that the resonant flyback circuit voltage is coupled into the amplifier loop output circuit by means of the flyback transformer. This arrangement obviates the need for floating power supplies ordinarily required to power the resonant flyback circuit if it were directly coupled to the amplifier output terminals. Also, different sweep speeds can be obtained, such as an expanded sweep where desired, by shunting the resonant capacitor with additional capacitance by means of an actuation relay or other means.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:

1. In combination:

a first source of signals having a predetermined waveform;

a load connected to said first signal source;

a second source of signals having a predetermined waveform;

means for combining said first and second source signals in a manner to provide the waveform characteristics of said first signal source in said load;

means for sensing a difference in the waveform characteristics of said first source signals and said load waveform to provide an error signal;

and means for combining said error signal with said first source signal.

2. In combination:

means for providing a first waveform signal;

an inductive load connected to said first waveform signal means;

means for providing a second signal in circuit with said inductive load including a switching circuit augmenting power delivered to said load by said first signal means;

means for combining signals from said first and second signal means in a manner to provide the waveform characteristics of said first signal in said load;

means for sensing a difference in the waveform characteristics of said first signal and said load waveform to provide an error signal;

and means for combining said error signal with said first signal.

3. An electronic scanning circuit comprising a source of a first sweep waveform signal;

an inductive load including beam deflection means connected to said first sweep waveform signal source;

a second signal source of a second signal connected in circuit with said inductive load including a switching circuit to augment the power delivered to said load by said first signal source including a transistor and diode in shunt relationship;

means for combining said first and second signals in a manner to provide a signal waveform in said load having the characteristics of said first signal;

means for sensing a difference in the waveform characteristics of said first signal and said load signal to provide an error signal;

and means for combining said error signal with said first signal.

4. An electronic scanning circuit comprising means for providing a first sweep waveform signal;

an inductive load including beam deflection means coupled to said sweep waveform signal means;

second signal means for providing a second signal and being connected in circuit with said inductive load including a resonant circuit to augment the power delivered to said load by said first signal means comprising storage means adapted to store energy during predetermined portions of said first sweep signal;

means for combining signals from said first and second signal means in a manner to provide a signal waveform in said load having the characteristics of said first signal;

means for sensing a difference in the waveform characteristics of said first signal and said load signal to provide an error signal;

and means for combining said error signal with said first signal.

5. In combination:

means for providing an input signal having a predetermined waveform characteristic;

means for amplifying said input signal;

a load coupled to said amplifying means;

means inductively coupled to said load and said amplifying means for providing a waveform to said load for producing therein a signal having the approximate voltage characteristics of said input signal, said inductively coupled means including switching means;

and feedback means for producing an error portion of said signal having the approximate voltage characteristics of said input signal and applying said error portion to the input of said amplifying means.

6. An electronic scanning circuit comprising means for providing a first sweep waveform signal having first and second equal portions;

an inductive load including beam deflection means connected to said means for providing a first sweep waveform signal;

means for providing a second signal for producing in said load a signal approximating a signal from said first signal means connected in circuit with said inductive load and including a storage means and a transistor conductive during the first portion only of said sweep signal and a diode conductive during the second portion only of said sweep signal, said transistor and diode connected in shunt across said storage means in a manner to short circuit said storage means during conduction of said transistor and of said diode;

feedback means for sensing a difference in the waveform characteristics of said first signal and said load signal to provide an error signal;

and means for combining said error signal with said first signal.

7. In combination:

a source of an input signal having a predetermined waveform characteristic;

an amplifier for amplifying said input signal;

a load coupled to said amplifier;

means inductively coupled to said load and said amplifier for providing a waveform for producing in said load a waveform having the approximate voltage characteristics of said input signal, said means including storage means and transistor and diode switching means being conductive during predetermined portions of said input signal and connected in shunt across said storage means in a manner to short circuit said storage means upon conduction of said switching means;

isolation means for providing said inductive coupling;

means for producing an error signal in response to a voltage difference between said input signal and said load waveform;

and means for combining said error signal with said input signal.

8. In combination:

a source of input signals having a predetermined waveform characteristic;

an amplifier for amplifying said input signals;

a load coupled to said amplifier for providing a linear sweep waveform;

means inductively coupled to said load and said amplifier for providing a second waveform, said means including storage means and transistor and diode switching means being conductive during predetermined portions of said input signals and connected in a manner to short circuit said storage means upon the conduction of said switching means;

isolation means for providing said inductive coupling;

means for sensing a voltage difference between said input signal and said load waveform to produce an error signal;

and means for combining said error signal with one of said input signals.

9. An electronic scanning circuit comprising means for providing a first sweep waveform signal having a rising portion;

an inductive load including beam deflection means connected to said sweep waveform signal means;

a second signal source connected in circuit with said inductive load including storage means adapted to store energy during the rising portion of said first sweep waveform;

means for combining said first and second signals;

means for sensing the voltage difference between said first signal and said combined signals;

and means for combining said difference signal with said first signal to provide the waveform of said first signal in said load.

References Cited by the Examiner

UNITED STATES PATENTS

| | | | |
|---|---|---|---|
| 2,460,601 | 2/1949 | Schade | 315—27 X |
| 2,466,537 | 4/1949 | De Vore | 315—27 |
| 2,587,313 | 2/1952 | Grundmann | 315—28 X |
| 2,654,855 | 10/1953 | Denton | 315—27 |
| 3,157,817 | 11/1964 | Shimada | 315—27 |

OTHER REFERENCES

Gray: "Applied Electronics," Wiley and Sons, New York, 1954, p. 570.

DAVID G. REDINBAUGH, *Primary Examiner.*